Sept. 24, 1929.  F. W. HILD  1,729,441
COMBINED CATHEAD AND OIL RESERVOIR
Filed Feb. 17, 1928
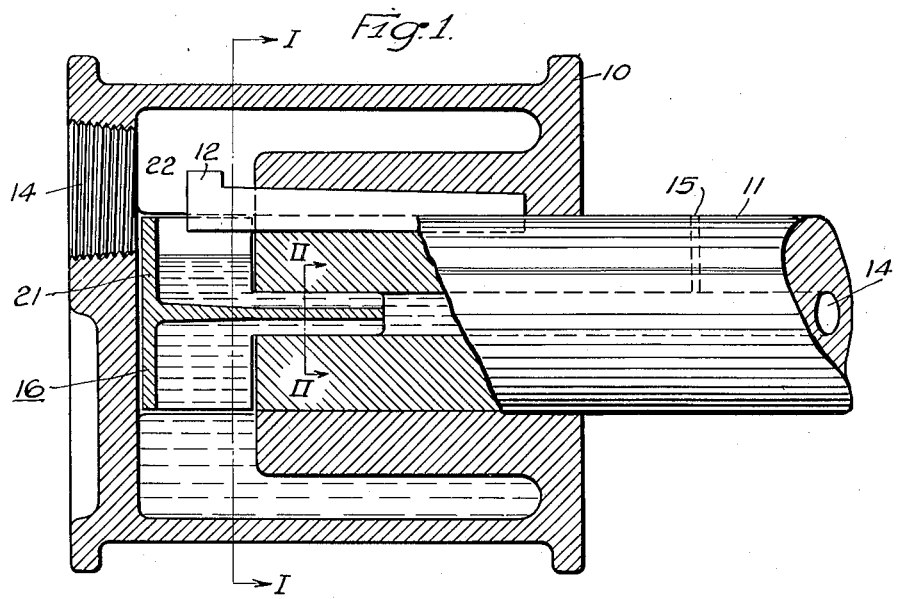
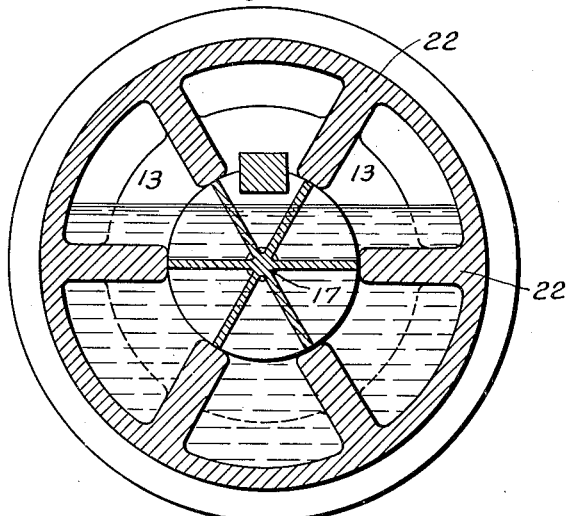
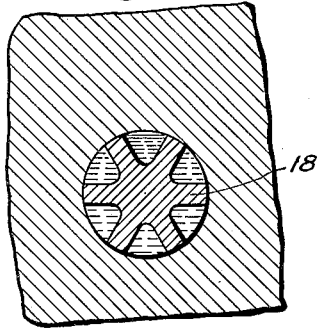
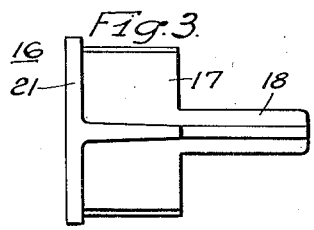
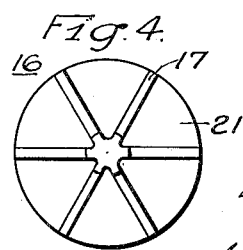
INVENTOR
Frederic W. Hild.
BY
ATTORNEY Patented Sept. 24, 1929

1,729,441

UNITED STATES PATENT OFFICE

FREDERIC W. HILD, OF LOS ANGELES, CALIFORNIA

COMBINED CATHEAD AND OIL RESERVOIR

Application filed February 17, 1928. Serial No. 255,056.

The invention relates generally to lubricating devices and more particularly to lubricating devices which may be utilized as catheads, lubricant reservoirs and feeding devices for rotary drilling draw-works mechanisms and the like.

The object of the invention generally stated is to provide a combination cathead and lubricating device which shall be efficient in operation and economically manufactured.

A more specific object of the invention is to provide for utilizing a cathead member of a draw-works mechanism for containing and feeding lubricating oils to the bearing members of the draw-works mechanism.

Other objects of the invention will become evident from the following description taken in conjunction with the drawings, in which:

Figure 1 is a cross-sectional view of a cathead member constructed in accordance with the present invention.

Fig. 2 is a cross-sectional end view of the cathead member taken along the line I—I of Fig. 1.

Fig. 3 is a side view of the lubricant feeding device as shown in Figs. 1 and 2.

Fig. 4 is an end view of the device shown in Fig. 3, and

Fig. 5 is an enlarged cross-sectional view of the stem portion of the lubricant feeding device taken along the line II—II in Fig. 1.

Referring to Fig. 1 of the drawing, the structure shown comprises a main body portion 10, commonly known as a cathead or winch head which is adapted to be secured to the power shaft 11 of the rotary well-drilling draw-works mechanism. As shown the cathead 10 is rigidly secured to the shaft 11 by means of a drive key 12.

In this particular embodiment of the invention provision is made for utilizing the ordinary type of cathead device as a lubricant container or reservoir from which lubricant may be fed to the bearing surfaces of the draw-works mechanism.

It will be observed that in order to provide a lubricant reservoir a hollow cathead 10 is utilized and it is divided into a plurality of compartments 13 as shown best in Fig. 2. The reservoir is illustrated as being partly filled with a lubricating medium to a level slightly above the center of the shaft 11. However, in practice the lubricating device will function efficiently with the lubricant standing at levels below the shaft.

An opening which may be closed by a screw plug 14 is provided in the base of the body portion 10 to facilitate the filling of the reservoir compartments 13 with lubricant and for placing the drive key 12 in its proper position to secure the cathead to the shaft 11.

As shown in Fig. 1, the lubricant is fed to the bearing surfaces through the bore 14 in the shaft 11, an oil duct designated at 15 being provided for lubricating the main bearing of the shaft 11 which is located adjacent the cathead.

In order to provide for automatically feeding the lubricant from the reservoir comprising the compartments 13, the feeding device 16 is utilized. The feeding device comprises a unitary member having a plurality of blades 17 arranged in a symmetrical fashion around a common axis as shown.

Since it is necessary to support the oil feeding device 16 in proper position in the reservoir, it is provided with a stem portion 18 which is adapted to extend into the bore 14 of the shaft 11 as shown in Fig. 1.

Referring to Fig. 5, it will be observed that the stem portion 18 is fluted, to provide longitudinally extending blades or fins which are a continuation of the main blades 17.

In order to permit the feeding device 16 to function in a manner similar to a revolving dipper or bucket, the paddle wheel part comprising the main blades 17 is closed at one end by a circular plate 21, and at the opposite end by the end of the shaft 11. It will be readily understood that this construction provides for trapping small quantities of lubricant as the cathead revolves to carry each of the dipper compartments 13 into such position that they may discharge the lubricant gathered while travelling through the lower one hundred and eighty degree arc of the complete revolution.

As hereinbefore stated, the reservoir is formed into a plurality of compartments designated as 13 by means of a plurality of inwardly extending vane or fin portions 22 which are formed integral with the inner surface of the main body portion 10. As will be observed, the blades 17 of the feeding device 16 are disposed in alignment with the fin portions 22, thereby forming compartments of triangular cross section.

It will be readily understood that when the cathead is rotating the vane or fin portions 22 function as a means for raising a quantity of the lubricant from the lower level of the reservoir to a level corresponding to the center of the shaft, or in case the level of the lubricant is higher to at least the level of the lubricant in the reservoir. In this way a quantity of lubricant is continuously fed into the triangular containers of the feeding device 16. Since these containers are in continuous communication with the bore 14 of the shaft 11 through the small channels formed by the radial fins 18, the lubricant is continuously fed into the bore, as the cathead rotates.

It is to be understood that the stem portion 18 which extends into the bore 14 of the shaft 11 causes the main blade 17 to rotate as if it were a part of the shaft itself which always keeps the blades 17 in alinement with the fin portion 22 which provides means for feeding the lubricant, even though the level of the lubricant falls below the bore in the shaft 11.

It may be stated in conclusion that while the illustrated example constitutes a practical embodiment of my invention, I do not wish to limit myself strictly to the exact details herein illustrated, since modifications of the same may be made without departing from the spirit and scope of the invention as defined in the appended claims.

I claim as my invention:

1. In combination a hollow shaft through which lubricant may be fed, a cathead and lubricating device for mounting on the shaft, said cathead and lubricating device comprising a main body portion provided with a lubricant reservoir, and means for directing the flow of lubricant, said means comprising a member disposed for rotation with the shaft and having a stem portion for supporting said member and cooperating in the distribution of the lubricant.

2. In combination, a hollow shaft through which lubricant may be fed, a cathead and lubricating device body portion for mounting on the shaft, said body portion being provided with a lubricant reservoir and a feeding device for delivering lubricant to the shaft, said feeding device being disposed to rotate with the shaft.

3. In combination, a hollow shaft through which lubricant may be fed, a cathead and lubricating device for mounting on the shaft, said device comprising a main body portion having a cylindrical outer surface and a reservoir for containing lubricants, means provided in the reservoir for lifting the lubricant as the shaft rotates, and means disposed within the reservoir to effect the distribution of the lubricant, said means being provided with lubricant receiving compartments disposed to receive the lubricant discharge from the lifting means.

4. In combination, a hollow shaft through which lubricant may be fed, a cathead and lubricating device body portion for mounting on the shaft, said body portion being provided with a lubricant reservoir having a plurality of compartments provided therein, and a feeding device for delivering lubricant to the shaft, said feeding device having lubricant receiving compartments communicating with said reservoir compartments to receive a discharge of lubricant from each reservoir compartment as the body portion rotates.

5. In combination, a hollow shaft through which lubricant may be fed, a cathead and lubricating device body portion for mounting on the shaft, said cathead and lubricating device body portion being provided with a lubricant reservoir, a feeding device for delivering lubricant to the shaft comprising a body portion having vanes forming compartments for receiving the lubricant and a stem for extending into the hollow shaft cooperative to guide the flow of the lubricant, and means provided on the inside of the cathead and lubricating device body portion for delivering lubricant to the feeding device.

6. In combination, a hollow shaft through which lubricant may be fed, a cathead and lubricating body portion for mounting on the shaft, said body portion being provided with a lubricant reservoir, a feeding device for delivering lubricant to the shaft comprising a body portion having vanes forming compartments for receiving the lubricant and a stem for extending into the hollow shaft, said stem being provided with longitudinally extending vanes to guide the flow of lubricant from the feeding device compartments and means dividing the cathead and lubricant device body portion into compartments having openings communicating with the compartments of the feeding devices.

7. In combination, a hollow shaft through which lubricant may be fed, a cathead and lubricating device body portion for mounting on the shaft, said body portion being provided with a lubricant reservoir having inwardly extending longitudinal vanes for lifting lubricant, and means disposed to trap the lifted lubricant or the shaft rotates thereby maintaining a pressure head in the reservoir, said means having a stem portion extending into the hollow shaft, said stem portion being provided with longitudinal channels communicating with the lubricant trapping means to permit lubricant to flow into the hollow shaft.

8. In combination, a hollow shaft through which lubricant may be fed, a cathead and lubricating device for mounting on the shaft, said device comprising a main body portion provided with a lubricant reservoir and inwardly extending fin portions for lifting the lubricant, and means cooperating with said fin portions for feeding the lubricant into the hollow shaft, said feeding means being provided with outwardly extending fin portions disposed in alignment with the inwardly extending fin portions of the main body portion.

9. In combination, a hollow shaft through which lubricant may be fed, a cathead and lubricating device body portion for mounting on the shaft, said body portion being provided with a lubricant reservoir, a feeding device for delivering lubricant to the shaft, comprising a main portion having a plurality of outwardly extending blades and a stem portion extending into the hollow of the shaft for supporting the feeding device adjacent the shaft end, said stem portion having longitudinal channels communicating with the valleys between the outwardly extending blades to permit lubricant to flow from the reservoir into the hollow shaft and vanes provided in the reservoir for delivering lubricant to the feeding device, said vanes being disposed in alignment with the blades of the feeding device.

10. In combination, a hollow shaft through which lubricant may be fed, a cathead and lubricating device body portion for mounting on the shaft, said body portion being provided with a lubricant reservoir having a plurality of open compartments formed by vane members extending inwardly from the interior surface of the reservoir to a distance less than the radius of the reservoir and longitudinally to the said body portion, and a feeding device for delivering lubricant to the shaft, said feeding device being provided with a similar number of outwardly extending vane members, a stem portion extending into the hollow shaft for supporting the feeding device adjacent the shaft end, and a disc member secured to the edges of the blades opposite the shaft end, thereby forming triangular shaped compartments for receiving lubricant from the compartments in the said cathead and lubricating device body portion.

In testimony whereof, I have hereunto subscribed my name this seventh day of February, 1928.

FREDERIC W. HILD.